United States Patent [19]

Jones et al.

[11] Patent Number: 4,830,673

[45] Date of Patent: May 16, 1989

[54] METHOD FOR REDUCING THE ABRASION OF CALCINED CLAY

[75] Inventors: Philip E. Jones, Sandersville; Ralph E. Turner, Jr., Tennille, both of Ga.

[73] Assignee: E.C.C. America Inc., Atlanta, Ga.

[21] Appl. No.: 915,091

[22] Filed: Oct. 3, 1986

[51] Int. Cl.[4] .................... C04B 14/10

[52] U.S. Cl. .................... 106/487; 106/308 Q; 501/146; 501/148

[58] Field of Search .................... 501/148, 146; 106/308 Q, 288 B

[56] References Cited

U.S. PATENT DOCUMENTS

| | | | |
|---|---|---|---|
| 3,014,836 | 12/1961 | Proctor, Jr. | 106/181.8 |
| 3,189,557 | 6/1965 | Shaler | 501/148 |
| 3,223,482 | 12/1965 | Puddington et al. | 106/288 B |
| 3,227,657 | 1/1966 | Haden et al. | 501/148 |
| 3,440,070 | 4/1969 | Dewey | 501/148 |
| 3,445,251 | 5/1969 | Nevins | 501/148 |
| 3,586,523 | 6/1971 | Fanselow et al. | 106/486 |
| 4,381,948 | 5/1983 | McConnell et al. | 106/416 |
| 4,619,705 | 10/1986 | Dixon et al. | 106/288 B |

FOREIGN PATENT DOCUMENTS

| | | | |
|---|---|---|---|
| 75934 | 4/1983 | European Pat. Off. | 501/148 |
| 2754576 | 6/1979 | Fed. Rep. of Germany | 106/308 Q |
| 3244894 | 6/1984 | Fed. Rep. of Germany | 501/148 |

*Primary Examiner*—William R. Dixon, Jr.
*Assistant Examiner*—Ann M. Bosco
*Attorney, Agent, or Firm*—Klauber & Jackson

[57] ABSTRACT

A method is provided for reducing the abrasiveness of calcined clay, e.g. kaolin clay. The method comprises contacting the clay prior to calcination with an aliphatic diol, preferably ethylene glycol, in an amount sufficient to reduce the abrasiveness of the calcined product.

5 Claims, No Drawings

METHOD FOR REDUCING THE ABRASION OF CALCINED CLAY

FIELD OF THE INVENTION

This invention relates generally to calcined clay products, and more particularly, relates to a method for reducing the abrasion value of an anhydrous white kaolin clay pigment. The pigment is particularly useful as a filler in paper products, but also finds use in other applications, such as in coating of papers.

PRIOR ART

In the course of manufacturing paper and similar products, including paperboard and the like, it is well-known to incorporate quantities of inorganic materials into the fibrous web in order to improve the quality of the resulting product. In the absence of such "fillers", the resultant paper can have a relatively poor texture due to discontinuities in the fibrous web. The fillers are also important in improving the printing qualities of the paper, i.e., by improving the surface characteristics. The use of appropriate fillers additionally improves the opacity and the brightness of a paper sheet of a given weight.

A number of inorganic materials have long been known to be effective for many of the aforementioned purposes. Among the best of these materials is titanium dioxide, which can be incorporated into the paper in the form of anatase or rutile. Titanium dioxide, however, is among the most expensive materials for such purposes. Thus, despite the effectiveness of such material as a filler, its use is limited, and satisfactory replacements have been sought.

Among the materials which have found increasing acceptance as paper fillers are calcined kaolin clays. Materials of this type are generally prepared by calcining a crude kaolin clay, which may have been initially subjected to prior beneficiation steps in order to remove certain impurities, e.g. for the purpose of improving brightness in the ultimate product. Such products are described in, for example, U.S. Pat. Nos. 3,014,836 to Proctor, Jr., and 3,586,523 to Faneslow et al, as well as in McConnell et al U.S. Pat. No. 4,381,948.

Those properties which render a calcined kaolin pigment particularly valuable for use as a filler are well-known. The brightness and opacifying characteristics are important in producing an acceptable paper sheet, i.e. a sheet which has whiteness, high opacity, good printability and light weight. Additionally, low abrasion is significant in order to assure that the resultant paper product may be manufactured and processed using conventional machinery without damaging the machinery.

There is a continuing search in the kaolin industry for methods for improving the brightness and opacifying characteristics of a calcined kaolin pigment as well as decreasing the abrasion of said clays. It is highly desirable that when a method for improving such a property is discovered that it not detrimentally affect another property. For example, if a method is derived for reducing the abrasion of a calcined kaolin pigment, it is highly desirable that such method not reduce the brightness or opacifying characteristics of the kaolin. Indeed, it is desirable that such a method (if anything) enhance the brightness and opacifying characteristics of the product.

OBJECTS AND SUMMARY OF THE INVENTION

It is thus an object of the present invention, to provide a method for reducing the abrasion of calcined clays, in particular of calcined kaolin clays.

It is a further object of this invention, to provide a method for reducing the abrasion of said kaolins without detrimentally affecting the brightness or opacity-producing characteristics provided by said kaolins.

The foregoing objects of this invention are achieved by a method for reducing the abrasion of calcined kaolins, comprising contacting the kaolin prior to calcining with an effective abrasion reducing amount of an aliphatic diol, wherein the diol has the formula $C_nH_{2n}(OH)_2$ wherein n is from 2 to 6.

Particularly preferred clays are those calcined kaolin clays described, for example in the aforementioned U.S. Pat. Nos. 3,014,836, 3,586,523 and 4,381,948, the entire disclosures of which are incorporated herein by reference. However, the method of the invention is applicable to other calcined kaolin clays.

The preferred aliphatic diol is ethylene glycol, i.e. 1, 2-ethane diol, although other type diols may be utilized. The effective amount of aliphatic diol ranges from about 0.5 to about 5%, and preferably about 0.5 to 2% by weight of dry clay of the kaolin clay utilized.

DESCRIPTION OF PREFERRED EMBODIMENT

The method of the present invention is applicable to any of the well-known types of calcined kaolin clays—i.e. the method may be practiced to treat the feed clay which is calcined to produce such known calcined clays. For example, the kaolin clay described in U.S. Pat. No. 3,014,836 to Proctor, Jr. may be treated by the method of this invention. Proctor, Jr. thus describes a calcined kaolin powder having a low abrasion, i.e., substantially 0 to 200 as determined by the "Valley" method described therein, and a certain minimum brightness. The kaolin described in U.S. Pat. No. 3,586,523 to Fanselow et al may also be treated by the method of this invention. Fanselow et al describes a finely divided, substantially anhydrous amorphous aluminum silicate obtained by calcining a fine particle size sedimentary kaolin clay.

Where superior light scattering properties are desired, a particularly preferred kaolin for treating by the method of this invention is that described in U.S. Pat. No. 4,881,948 to A. D. McConnell et al. The calcined product described therein is an anhydrous white kaolin clay pigment consisting of porous aggregates of kaolin clay platelets which exhibit exceptionally high light scattering ability when incorporated as a filler in paper. This pigment exhibits a Valley abrasion value below 30 mg, and preferably below 20 mg, and a GE brightness of at least 93. In all instances in this specification, brightness values are obtained according to the standard specification established by TAPPI procedure T-646 OS-75. Abrasions are Valley abrasions determined by the Institute of Paper Chemistry Procedure 65. When incorporated as a filler in paper, the McConnell et al pigment displays an exceptionally high pigment scattering coefficient. This pigment substantially corresponds to the commercially available product ALPHATEX ® of the assignee Anglo-American Clays Corporation (Atlanta, Ga.).

In a preferred method for practicing this invention, the crude kaolin clay is blunged and dispersed to form an aqueous dispersion. The blunged and dispersed aqueous slurry is subjected to a particle size separation, from which there is recovered a fine fraction slurry of the clay. Following this, the clay may be dewatered by being flocculated and filtered, redispersed as a slurry, and dried; or the classified slurry may be dewatered by directly drying. Pursuant to the invention, the ethylene glycol or other diol is preferably added to the clay slurry which is fed to the dryer. Drying of the slurry can be effected by various means, e.g. by spray drying—to produce an essentially moisture-free clay.

The dried clay is then thoroughly pulverized to break up agglomerates. The pulverized product is then calcined by heating to a temperature of at least about 900° C., and under conditions such that substantially none of the clay is heated to a temperature in excess of 1100° C. Thereupon the product of the calcination step is cooled and pulverized to provide the final pigment product.

The crude kaolin, forming the source material utilized in preparing the calcined kaolin as above, may be derived from numerous types of deposits of crude kaolins.

Pursuant to the invention, the aforementioned kaolin clays are thus contacted prior to calcining with an effective abrasion reducing amount of an aliphatic diol. The diol has the formula:

$$C_nH_{2n}(OH)_2$$

wherein n is from 2 to 6. Preferably such diol is ethylene glycol, i.e. 1, 2 - ethane diol, although other equivalent type diols may be utilized, e.g. propylene glycol, 1, 3 butylene glycol, or hexylene glycol.

The effective amount of diol utilized is, for general guidance, from about 0.5% to 5%, preferably from about 0.5% to 2% by weight of the amount of clay, calculated on a dry clay basis. Any method of contacting the diol with the calciner feed clay may be utilized. It is preferred, to mix the diol with the slurried feed to the drier, as aforementioned.

It has been found that the aforementioned method of producing calcined clay, particularly calcined kaolin clay, produces a clay having a reduced Valley abrasion without detrimentally affecting the brightness of the clay.

Practice of the present invention will now be illustrated by Examples, which are deemed illustrative of both the process taught by the present invention and the product yielded in accordance with the invention.

The addition of the aliphatic diol ethylene glycol as aforedescribed prior to calcination of the feed clay for ALPHATEX® brand clay from Anglo-American Clays Corporation, resulted in a surprising reduction in Valley abrasion values. It was also found that the other physical properties of the clay, such as brightness and particle size distribution were not significantly changed; in fact brightness appeared to have been marginally improved.

EXAMPLE I

In this Example the crude clay used as a starting material was a coarse Georgia cream clay. This crude was processed by the steps of blunging, degritting, and dispersing, fractionating to substantially 100% <1 micrometer; flocculating and filtering; redispersing the filter cake; and treating the resulting redispersed slurry at 58% solids with various amounts of the ethylene glycol additive. Thereafter, the slurry was spray-dried, and pulverized, and then calcined at 1975° C. for 30 minutes. Brightness, Valley Abrasion and PSD's were determined for the calcined products and are shown in Table I:

TABLE I

| Sample | GE Brightness | Valley Abrasion mg wt loss | Particle Size Distribution, % less than specified micrometers | | | | | |
|---|---|---|---|---|---|---|---|---|
| | | | 10 | 5 | 2 | 1 | 0.5 | 0.25 |
| Control (0% ethylene glycol) | 93.3 | 27.7 | 100 | 99 | 93 | 72 | 12 | 0 |
| 0.05% Ethylene glycol | 93.3 | 10.9 | 100 | 99 | 93 | 74 | 15 | 0 |
| 0.5% Ethylene glycol | 93.6 | 10.5 | 100 | 99 | 92 | 72 | 15 | 0 |
| 2.0% Ethylene glycol | 93.5 | 10.1 | 100 | 99 | 94 | 74 | 14 | 0 |

EXAMPLE II

In this Example, the crude utilized was a fine particle size Georgia kaolin. The crude was processed by the steps of blunging and dispersing, degritting and fractioning to substantially 100% less than 1 micrometer ESD. The ethylene glycol was then added to the slurry at 45% solids at various levels, and the slurry was then spray-dried and processed as in Example I. Brightness, Valley Abrasion and PSD's were determined for the calcined products and are shown in Table II:

TABLE II

| Sample | GE Brightness | Valley Abrasion mg wt loss | Particle Size Distribution, % less than specified micrometers | | | | | |
|---|---|---|---|---|---|---|---|---|
| | | | 10 | 5 | 2 | 1 | 0.5 | 0.25 |
| Control (0% ethylene glycol) | 93.2 | 22.8 | 99 | 98 | 93 | 83 | 42 | 2 |
| 0.05% Ethylene glycol | 93.3 | 13.3 | 100 | 99 | 96 | 88 | 45 | 1 |
| 0.5% Ethylene glycol | 93.2 | 13.1 | 100 | 98 | 92 | 79 | 35 | 0 |
| 2.0% Ethylene glycol | 93.3 | 11.9 | 100 | 98 | 91 | 78 | 34 | 0 |

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. In the method for producing an anhydrous high-brightness white kaolin clay pigment having enhanced light-scattering properties when incorporated as a filler in paper; said process comprising the steps of blunging and dispersing a crude kaolin clay, to form an aqueous dispersion of same; subjecting said aqueous clay dispersion to a particle size separation, and recovering from said separation a fine particle size fraction slurry of said clay, dewatering said slurry to produce a substantially moisture-free clay; milling said substantially moisture-free clay to break up agglomerates; calcining the milled clay product by heating same to a temperature of at least 900° C., and under conditions such that substantially none of said clay is heated to a temperature in excess of 1100° C., and cooling the product of said calcination step and milling same;

the improvement for reducing the abrasion of the said calcined clay product, comprising:

contacting the clay prior to calcining with an effective abrasion reducing amount of ethylene glycol.

2. A method in accordance with claim 1, wherein the amount of said ethylene glycol is from about 0.5 to 5% by weight of the dry kaolin.

3. A method in accordance with claim 2, wherein the amount of said ethylene glycol is from about 0.5 to 2% by weight of the dry kaolin.

4. A method in accordance with claim 1, wherein said dewatering of said clay includes feeding said clay as an aqueous slurry to a drier; said ethylene glycol being added to said slurry in advance of said drier.

5. A method in accordance with claim 4, wherein said slurry is spray-dried; said ethylene glycol being added to the slurry feed to the spray-drier.

* * * * *